United States Patent [19]

Hasegawa et al.

[11] Patent Number: 5,074,392
[45] Date of Patent: Dec. 24, 1991

[54] CONTROL SYSTEM FOR ELECTROMAGNETIC CLUTCH FOR VEHICLE

[75] Inventors: Akira Hasegawa; Kazuhiko Sato; Michimasa Horiuchi, all of Katsuta; Shun-ichiro Sugimoto, Tokyo, all of Japan

[73] Assignees: Hitachi, Ltd.; Hitachi Automotive Engineering CO. Ltd., both of Tokyo, Japan

[21] Appl. No.: 503,983

[22] Filed: Apr. 4, 1990

[30] Foreign Application Priority Data

Apr. 12, 1989 [JP] Japan .................. 1-090715

[51] Int. Cl.⁵ .............................. B60K 41/28
[52] U.S. Cl. ........................ 192/52; 192/76; 192/92; 192/21.5; 192/103 R
[58] Field of Search ............ 192/52, 76, 92, 96, 192/103 R, 21.5

[56] References Cited

U.S. PATENT DOCUMENTS

| | | | |
|---|---|---|---|
| 4,515,257 | 5/1985 | Takano et al. | 192/96 X |
| 4,653,621 | 3/1987 | Oshiage | 192/52 X |
| 4,675,817 | 6/1987 | Sakakiyama et al. | 192/76 X |
| 4,680,712 | 7/1987 | Sakakiyama et al. | 192/76 X |
| 4,787,489 | 11/1988 | Miyawaki | 192/52 |
| 4,848,528 | 7/1989 | Ohkumo et al. | 192/76 X |
| 4,848,544 | 7/1989 | Ohkumo et al. | 192/76 |

FOREIGN PATENT DOCUMENTS

| | | |
|---|---|---|
| 92950 | 11/1983 | European Pat. Off. . |
| 153051 | 8/1985 | European Pat. Off. . |
| 62-53243 | 3/1987 | Japan . |
| 2158912 | 11/1985 | United Kingdom . |

Primary Examiner—Richard Lorence
Attorney, Agent, or Firm—Antonelli, Terry, Stout & Kraus

[57] ABSTRACT

A transmission includes a control unit which controls engagement/disengagement of an electromagnetic clutch such that it is disengaged when it is detected that a vehicle is at a stop, and such that the vehicle creeps at a predetermined speed when pressing of an accelerator pedal is detected.

7 Claims, 8 Drawing Sheets

CONTROL SYSTEM FOR ELECTROMAGNETIC CLUTCH FOR VEHICLE

BACKGROUND OF THE INVENTION

The present invention relates to a transmission for a vehicle, and more particularly, to a transmission for a vehicle which is suitable for use in creeping control.

Vehicles which employ an internal combustion engine, such as a gasoline engine, are provided with a transmission in order to transmit the power of the internal combustion engine to the driving wheels.

Recently, automatic transmissions have come into wide use because of the convenience that they offer.

Such automatic transmissions are disclosed in, for example, Japanese Patent Laid-Open No. 62-53243. This transmission includes a V-belt and opposed conical pulleys. Speed change is achieved by the control of the interval of the opposed conical pulleys.

The above-described automatic transmission further includes an electromagnetic clutch in order to transmit the power of the internal combustion engine to the driving wheels. Engagement/disengagement of the electromagnetic clutch is controlled in accordance with the engine speed and the degree to which the accelerator pedal is pressed.

However, the above-described conventional technique requires the driver to alternate the operation of the accelerator pedal and a brake pedal when he or she is driving at a very slow speed on a crowded street or the like while maintaining an adequate space between the vehicle and any vehicle which is running just ahead.

SUMMARY OF THE INVENTION

An object of the present invention is to provide a transmission for a vehicle which enables the vehicle to creep.

To this end, the present invention provides a transmission for a vehicle which includes a control unit which controls engagement/disengagement of an electromagnetic clutch associated with the transmission such that it is disengaged when it is detected that the vehicle is at a stop, and such that the vehicle creeps at a predetermined speed when actuation of the accelerator pedal is detected.

DETAILED DESCRIPTION OF THE PREFERRED EMBODIMENTS

An embodiment of the present invention will be described below with reference to FIGS. 1 through 8.

Figure 1:
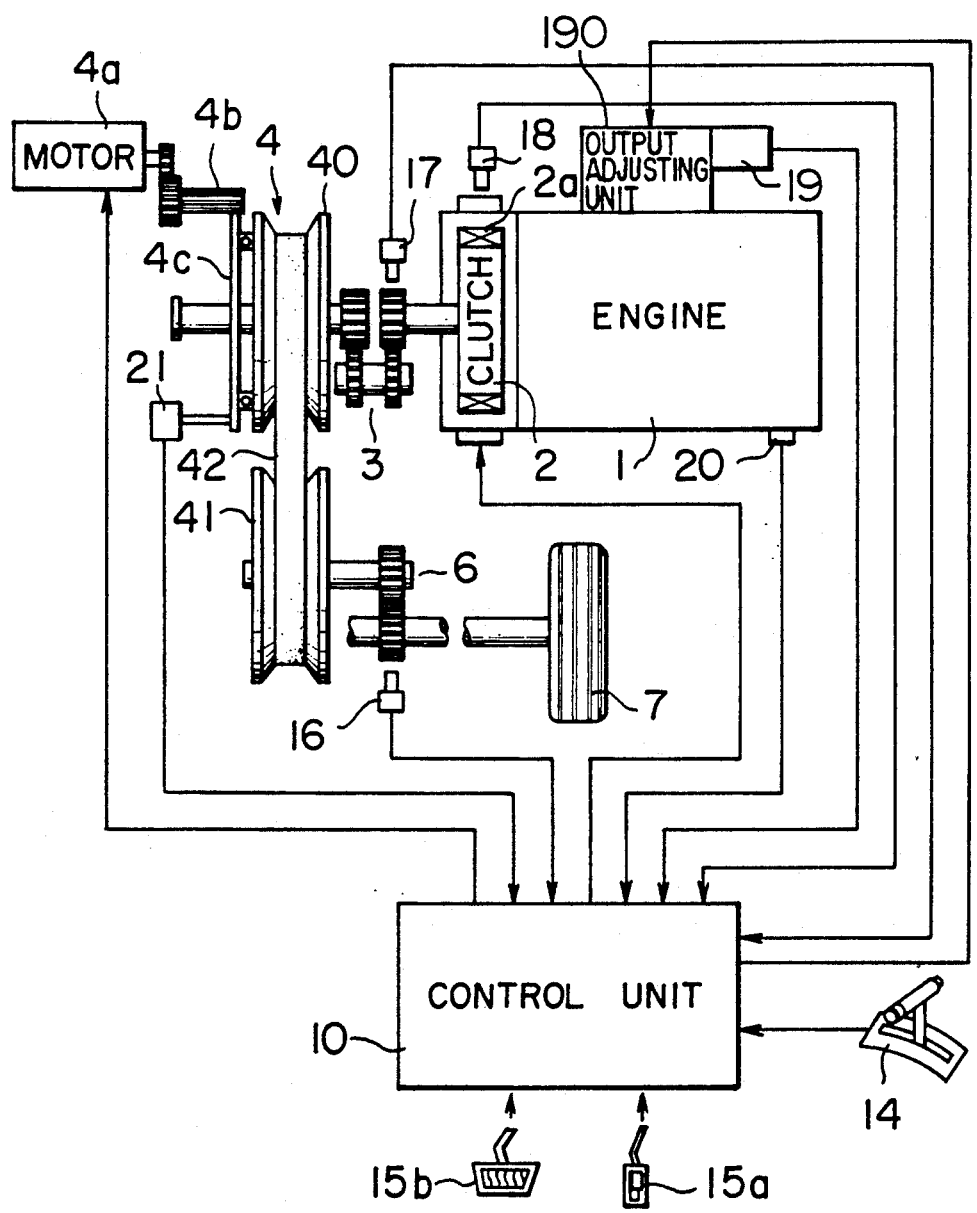
FIG. 1 shows a continuously variable transmission according to the present invention.

FIG. 1 shows an embodiment of a continuously variable transmission according to the present invention. In this transmission, transmission of the rotational torque of an engine 1 is controlled by the engagement/disengagement of an electromagnetic clutch 2. The torque of the engine 1 is transmitted to a driving wheel 7 through a reduction gear 3, a continuously variable transmission unit 4, and a differential gear 6 when the electromagnetic clutch is so controlled so as to allow the vehicle to run.

The electromagnetic clutch 2 is of the powder type which contains magnetic powders that gather and turn into a hard mass to transmit torque when a current is supplied to a coil 2a within the clutch from a control unit 10 which performs control of the transmission.

The continuously variable transmission unit 4 is of the known belt type continuously variable transmission which includes a driving pulley 40, a driven pulley 41 and a V-shaped belt 42 which extends between these pulleys 40 and 41. Both the pulleys 40 and 41 are opposed conical pulleys.

In this continuously variable transmission unit, speed change is achieved and change gear ratio is continuously changed over a predetermined range by moving a pulley pressing plate 4c by means of an electric actuator, such as a DC magnet motor 4a, through a motor reduction gear 4b to the left and right as viewed in FIG. 1, thereby controlling the interval of the driving pulley 40.

Next, various sensors which are employed to detect the conditions of various parts will be described.

An engine speed detecting electromagnetic pickup sensor 18 detects engine speed; an input shaft rotational speed detecting electromagnetic pickup sensor 17 detects the rotational speed of the driving pulley 40; a differential gear rotational speed detecting electromagnetic pickup sensor 16 detects the rotational speed of the driven pulley 41 and the vehicle speed; a throttle valve sensor 19 detects the opening of a throttle valve; a water temperature sensor 20 detects the temperature of an engine cooling water; and a pulley position sensor 21 detects the interval of the driving pulley 40 (which is proportional to the change gear ratio).

A selector switch 14 indicates shift positions including parking, reverse, neutral and drive. The on/off state of the accelerator pedal is detected by an accelerator pedal switch 15a mounted on the accelerator pedal, and the on/off condition of the brake pedal is detected by a brake switch 15b mounted on the brake pedal. In FIG. 1, a reference numeral 190 denotes an output adjusting unit for controlling the idling engine speed by adjusting the opening of the throttle valve.

The detection signals output from the above-described sensors are input to the control unit 10. The control unit 10 outputs a driving pulse to the DC motor 4a or to the electromagnetic clutch 2 in accordance with the state of the vehicle or the control by the driver.

Figure 2:
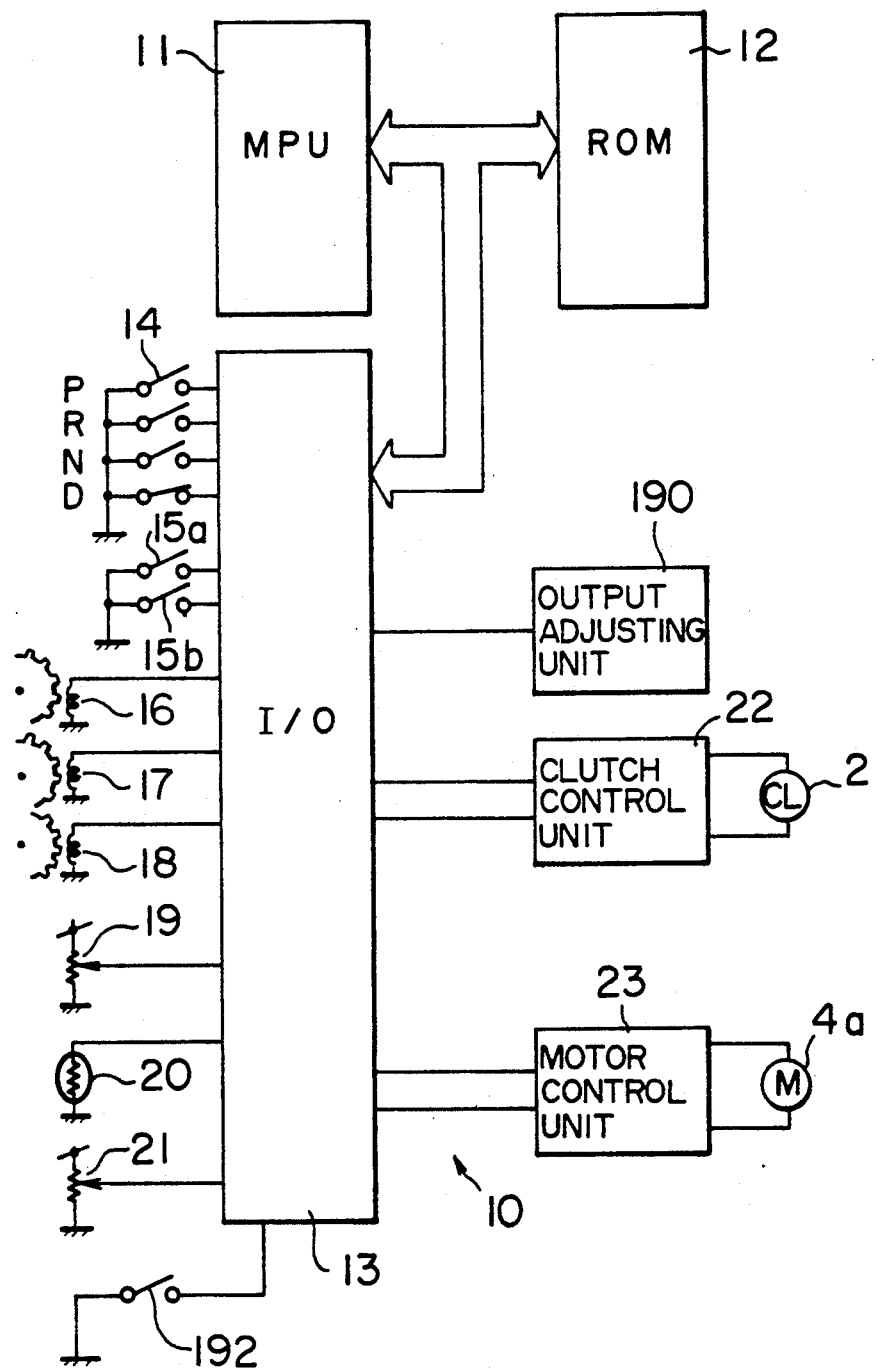
FIG. 2 shows a control unit in detail.

Next, the control unit 10 will be described in detail with reference to FIG. 2. The control unit 10 includes a microcomputer which is composed of a micro processing unit (MPU) 11, a read-only memory (ROM) 12, and an input/output interface (I/O LSI) 13. The control unit 10 takes in the detection signals from the selector switch 14 which detects the shift position, the accelerator switch 15a, the brake switch 15b, the various rotational speed detecting sensors 16 through 18, the throttle valve sensor 19, the water temperature sensor 20 and the pulley position sensor 21, and outputs data obtained by operating on these signals.

This output data is sent to the DC motor 4a through a motor control unit 23 to control the motor 4a and to the electromagnetic clutch 2 through a clutch control unit 22 to control the clutch 2.

The data representing parking (P), reverse(R), neutral (N) or drive (D) is sent from the selector switch 14 to the I/O LSI 13. An "acceleration" signal indicating whether or not the accelerator pedal is actuated (the accelerator pedal is turned off) is input from the accelerator switch 15a to the I/O LSI 13, and a "brake" signal indicating whether or not the brake pedal is pressed is input from the brake switch 15b to the I/O LSI 13.

From the electromagnetic pickup sensor 18 for detecting a pulse representative of the engine speed, the electromagnetic pickup sensor 17 for detecting a pulse representative of the rotational speed of the input shaft, and the electromagnetic pickup sensor 16 for detecting a pulse representative of the rotational speed of the differential gear, corresponding pulses are input to the I/O LSI 13. The I/O LSI 13 calculates the rotational speeds of the various components from the period of these pulses and inputs the obtained speed data to the MPU 11.

Since the signal from the throttle valve sensor 19 which represents the opening degree of the throttle valve, the signal from the water temperature sensor 20 which represents the temperature of the engine cooling water, and the signal from the pulley position sensor 21 which represents the interval of the driving pulley 40 of the continuously variable transmission unit 4 are analog signals, they are input to an analog/digital (A/D) converter incorporated in the I/O LSI 13. The converted digital signals are input to the MPU 11.

The MPU 11 executes a program written in the ROM 12 while reading out the various data input to the I/O LSI 13 when necessary, and writes in the I/O LSI 13 the control data for the electromagnetic clutch 2 and control data for the dc motor 4a, such as conduction ratio.

The I/O LSI 13 converts the control data input from the MPU 11 into a pulse signal, and outputs it to the clutch control unit 22 and to the motor control unit 23.

The motor control unit 23 outputs a pulse signal representing a variable conduction ratio to drive the DC motor 4a.

Also, the motor control unit 23 monitors the motor current by detecting the motor current and inputting the detected current to the A/D converter of the I/I LSI 13, so that the output of the motor driving pulse can be stopped and the motor control unit 23 and the DC motor 4a can thereby be protected during the control of the motor or when an abnormality occurs, e.g., when an over-current flows in the motor in a state where the motor is locked.

The clutch control unit 22 performs control of the electromagnetic clutch 2 in a similar manner as in the case of the motor control by means of the pulse signal from the I/O LSI 13. More specifically, the clutch control unit 22 outputs a pulse signal representative of a variable conduction ratio to drive the clutch 2. Also, the clutch control unit 22 monitors the clutch current by detecting the clutch current and inputting it to the A/D converter of the I/O LSI 13, so that the output of the clutch driving pulse can be stopped and the clutch control unit 22 and the clutch 2 can thereby be protected during the control of the clutch or when an abnormality occurs, e.g., when an excess-current flows in the clutch. In FIG. 2, a reference numeral 192 denotes an air conditioner sensor which detects the on/off state of an air conditioner.

Figure 3:
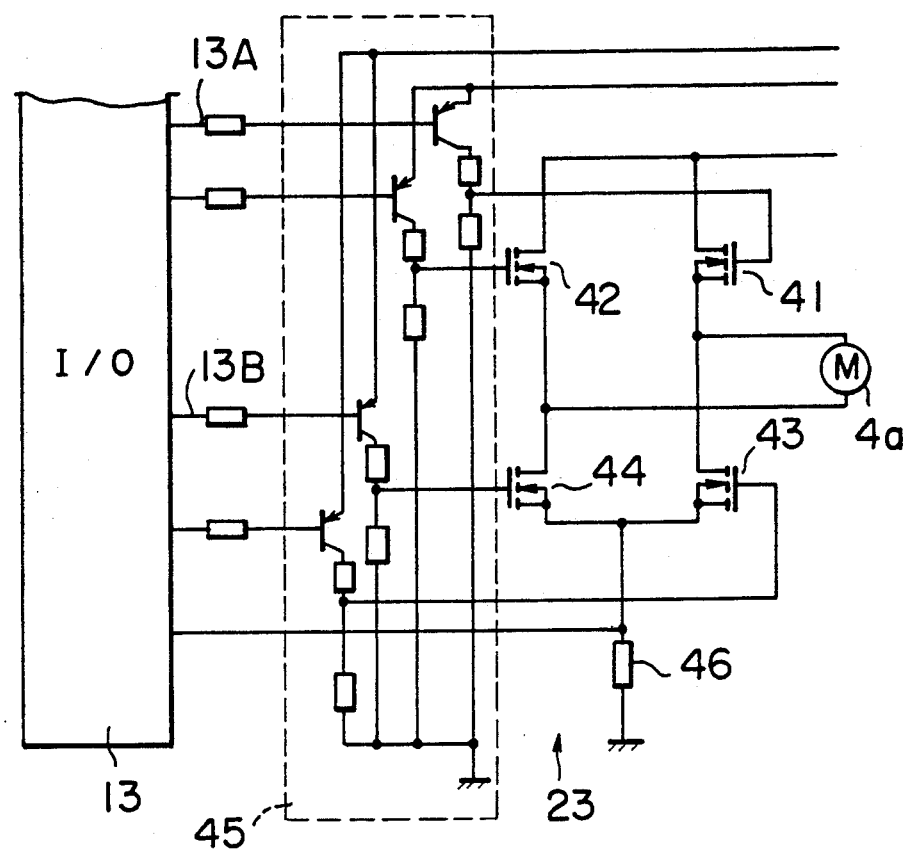
FIG. 3 shows a motor control unit in detail.

FIG. 3 shows the motor control unit 23 in more detail.

The DC motor 4a is connected to power field-effect transistors (FET) 41 through 44, which are in turn connected to the I/O LSI 13 through a gate circuit 45 so that they can be turned on and off by the pulse signal from the I/O LSI 13. Four power FETs 41 through 44 are employed so that the DC motor 4a can be rotated in either of two directions. Normal and reverse rotations of the DC motor 4a are controlled by using a first loop consisting of the power FET 41, the DC motor 4a and the power FET 44 in which current flows in that order and a second loop consisting of the power FET 42, the DC motor 4a and the power FET 43 in which current flows in that order. In FIG. 3, a reference numeral 46 denotes a resistance which detects the current that flows in the motor 4a.

Figure 4:
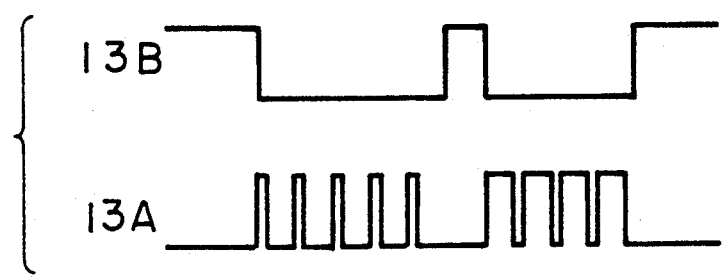
FIG. 4 shows motor control pulses.

FIG. 4 shows pulse signals 13A and 13B which control the drive of the motor 4a. They are generated in order to turn on and off the FETs 41 and 44, respectively. A maximum current flows in the motor 4a when the motor 4a is kept on (the conduction ratio is 100%) by means of the pulse 13A, while no current flows in the motor 4a when the motor 4a is kept off by means of the pulse 13A. The current which flows in the motor 4a ranges between maximum and minimum values and corresponds to the time during which the motor 4a is on. The direction of the rotation of the motor 4a is determined by the pulse 13B.

Next, the pulses from the I/O LSI 13 will be described in detail with reference to FIG. 4.

When the pulse 13B falls, the power FET 44 is turned on. At that time, if the pulse 13A is at the logical low level, the power FET 41 is on, and an average value of the voltage applied during the time the pulse 13A is at the logical low level is applied to the DC motor 4a so as to activate it. At that time, since the time constant of the motor is longer than the period of the pulse, the motor current continues to flow in the motor through a free wheel diode incorporated in the power FET even while the pulse 13A is at the logical high level.

Figure 5:
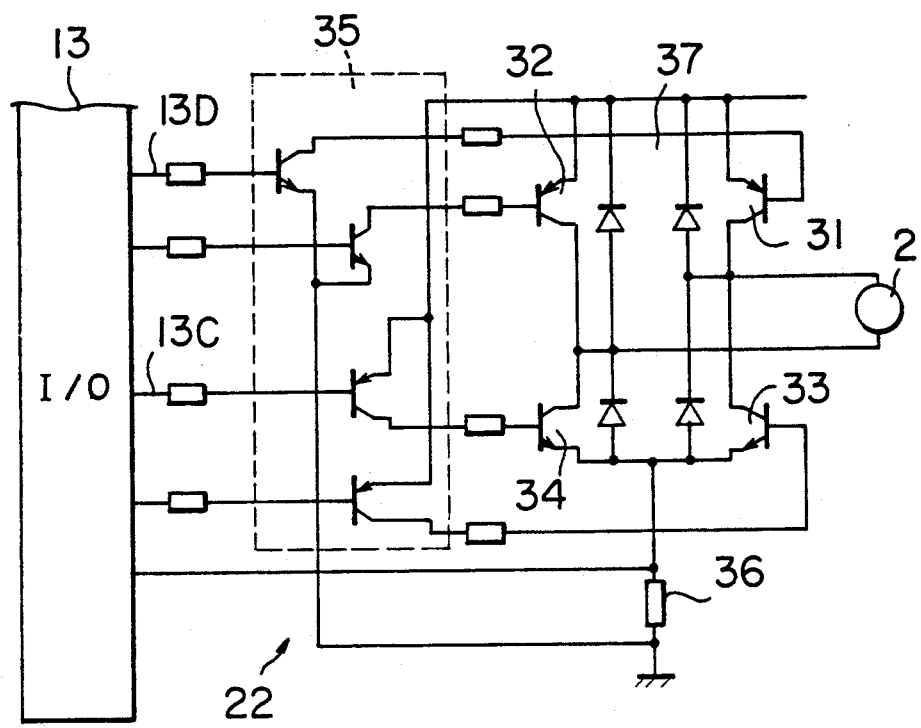
FIG. 5 shows a clutch control unit in detail.

FIG. 5 shows the clutch control unit 22 in detail. Pulses 13C and 13D have the function substantially the same as that of the pulses 13A and 13B. The current that flows in the clutch 2 is determined by the pulse 13C, and the polarity of the current is determined by the pulse 13D. The reference numeral 36 denotes a resistance which detects the current that flows in the clutch 2.

The electromagnetic clutch 2 is connected to power transistors 31 through 34, which are in turn connected to the I/O LSI 13 through a gate circuit 35 so that they can be turned on and off by the pulses from the I/O LSI 13.

The on/off state of the power transistors 31 through 34 changes the magnitude of the current that flows in the coil provided in the clutch 2. As the magnitude of the current that flows in the clutch 2 increases, the magnetic powders contained in the clutch turn into a mass, and the engine torque is transmitted therethrough. Complete disengagement of the clutch 2 is not achieved due to the residual magnetism existing in the clutch 2 when the current that flows in the clutch 2 is reduced to zero. Therefore, a load current is caused to flow in the clutch 2 so as to generate a magnetic force in a reverse direction and thereby remove this residual magnetism. This requires four power transistors 31 through 34.

Figure 6:
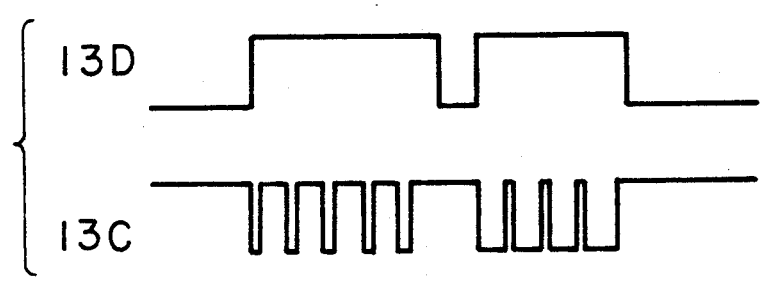
FIG. 6 shows clutch control pulses.

Next, the pulses from the I/O LSI 13 will be described in detail with reference to FIG. 6.

When the pulse 13D falls, the power transistor 34 is turned on. At that time, if the pulse 13C is at the logical low level, the power transistor 31 is on, and this allows an average value of voltage applied while the pulse 13C is at the logical low level to be applied to the electromagnetic clutch 2 to activate the clutch 2.

Figure 7:
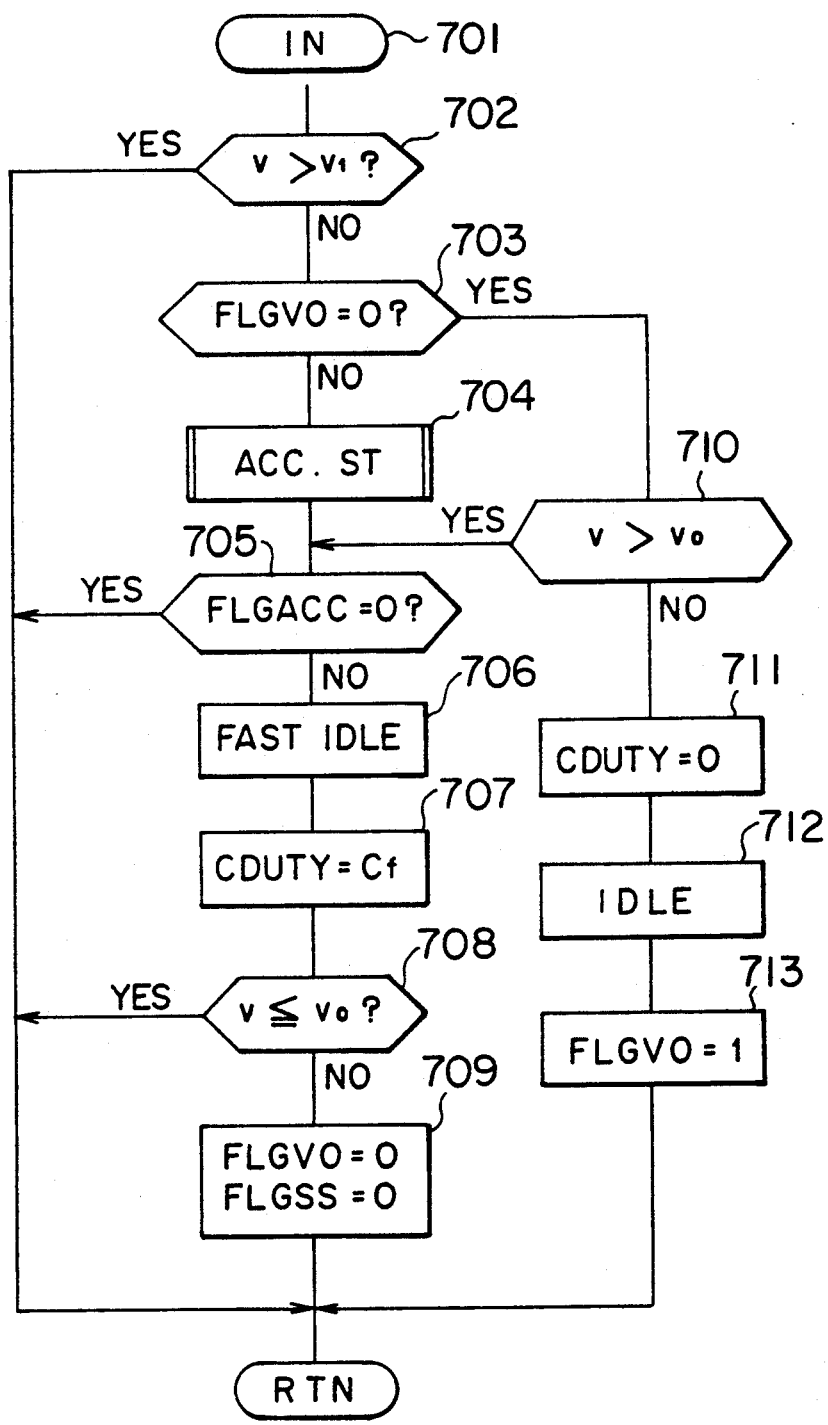
FIGS. 7 and 8 are flowcharts of the operation of an MPU.
Figure 8:
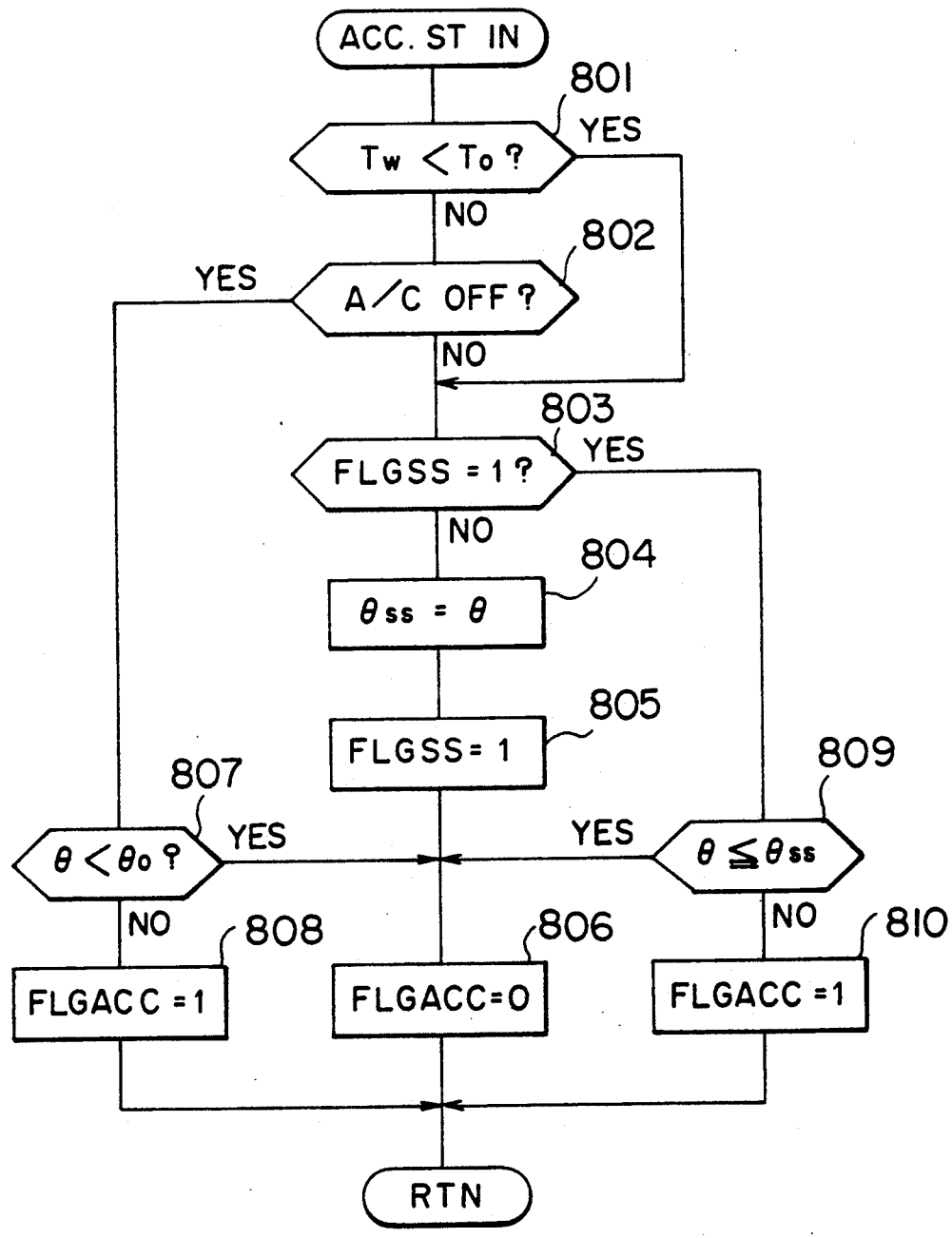

Next, control of the creeping will be described with reference to the flowcharts in FIGS. 7 and 8. The control graphically presented by the flowcharts shown in FIGS. 7 and 8 is carried out by the MPU which executes an operation each time an interrupt signal is output to the MPU. The interrupt signal is output to the MPU at fixed intervals (e.g., in a period of 20 msec).

Once this operation is started in step 701, it is determined in step 702 whether or not the vehicle speed v is greater than a predetermined value $v_1$. If the vehicle speed is greater than the predetermined value $v_1$, the vehicle is running in a normal condition, and control of the creeping is unnecessary. So, the process is ended. However, when the vehicle is at a stop, the vehicle speed v is zero, so the process goes to step 703.

In step 703, it is determined whether or not 0 is set as a flag FLGV0 which indicates whether or not the vehicle is at a stop. The flag FLGV0 is set in the processings of steps 708 and 709, which will be described later. In steps 708 and 709, if the vehicle speed v is equal to or greater than the predetermined value $v_0$, i.e., if the vehicle is running, 0 is set as the flag FLGV0. If the vehicle is at a stop, 1 is set as the flag FLGV0. If it is determined in step 702 that the vehicle is not in a running state and it is determined in step 703 that the vehicle was previously in a running state, the processings from step 710 to step 713 are executed for control to be performed when the vehicle, after running, is stopping.

If it is determined in step 703 that the vehicle is at a stop, control of the creeping is performed in step 704 and subsequent steps. First, subroutine ACC.ST for determining whether or not the start of vehicle movement is called for is carried out in step 704. In this subroutine ACC.ST, which will be described in detail with reference to FIG. 8, 1 is set as FLGACC if the driver is showing an intention of starting movement of the vehicle, while 0 is set if he is not showing an intention of starting movement of the vehicle.

Next, in step 705, it is determined whether or not the driver is showing an intention of starting creeping movement of the vehicle from the flag FLGACC which indicates whether or not the vehicle creeping movement of is to be started. If the driver is not showing an intention of starting creeping movement of the vehicle, control of the creeping is not necessary, so the process is ended.

Thus, when the vehicle is at a stop, so long as the driver shows no intention of starting creeping of the vehicle, the conduction ratio of the electromagnetic clutch remains zero, and monitoring of the flag FLGACC is continued.

If the driver is showing an intention of starting creeping movement of the vehicle, 1 is set as the flag FLGACC, and fast idling speed control is performed in step 706. In this control, the output adjusting unit 190 is driven to slightly increase the engine speed. Next, in step 707, cf is set as the conduction ratio CDUTY of the electromagnetic clutch 2. The conduction ratio ensures transmission of a small amount of the engine output torque which is required for creeping of the vehicle.

Next, it is determined in step 708 whether or not the vehicle speed v is equal to or lower than a predetermined value $v_0$. If the vehicle speed v is equal to or lower than the predetermined value $v_0$, the process is ended. If the vehicle speed v is greater than the predetermined value $v_0$, 0 is set as flag FLGV0 which indicates that the vehicle is not at a stop in step 709. Also, 0 is set as a flag FLGSS which is used to learn the determination level, which will be described later. Thereafter the process is ended.

Even though the driver presses the accelerator pedal and thereby shows an intention of starting movement of the vehicle, movement of the vehicle is not started immediately. It takes some time for the vehicle to start actually. In consequence, when the driver keeps pressing the accelerator pedal to keep showing an intention of starting movement of the vehicle, and when the vehicle speed has thereby reached the predetermined speed $v_0$, 0 is set as the flag FLGV0 which indicates that the vehicle is not at a stop.

Next, the process executed when 0 is set as the FLGV0 will be described.

Once the accelerator pedal has been kept pressed and the vehicle speed v has reached the predetermined value $v_0$, the process goes from step 703 to step 710 where it is determined again whether or not the vehicle speed v is greater than the predetermined value $v_0$. However, if the vehicle speed is sufficiently higher by this time than that obtained when the driver just started to press the accelerator pedal, the process goes to step 705. At that time, since the subroutine ACC.ST is not called, 1 is fixedly set as the flag FLGACC which indicates whether or not the movement vehicle is starting. Consequently, the fast idling speed control is performed in step 706, and cf is set as the conduction ratio CDUTY of the electromagnetic clutch in step 707.

Thus, once the vehicle speed v reaches the predetermined value $v_0$, the fast idling speed is allocated regardless of the pressing state of the accelerator pedal so as to increase the engine speed, and cf is set as the conduction ratio CDUTY of the electromagnetic clutch so as to transmit a small amount of engine torque. More specifically, control of the creeping continues until the driver presses the brake pedal and shows an intention of stopping the vehicle and the vehicle speed v reaches the predetermined value $v_0$.

Once the brake pedal is pressed and the vehicle speed v becomes less than $v_0$, the process goes from step 710 to step 711, and 0 is set as the conduction ratio CDUTY of the electromagnetic clutch. More specifically, the clutch is disengaged so that no engine power is transmitted to the driving wheels. Next, in step 712, idling speed control is performed so as to maintain the engine speed at an objective idling speed. Thereafter, in step 713, 1 is set as flag FLGV0 which indicates that the vehicle is at a stop, and the process is ended.

Once the vehicle, after being under the control of creeping, is accelerated to a vehicle speed v which is higher than the predetermined value $v_1$, the process of step 702 is executed and then the process is ended. The predetermined value $v_1$ is sufficiently larger than the predetermined value $v_0$.

Next, the subroutine ACC.ST will be described with reference to the flowchart of FIG. 8. In this subroutine, determination as to whether or not the driver is pressing the accelerator pedal and is showing an intention of driving the vehicle at a very slow speed is made by determining whether or not the throttle valve is open.

In step 801, it is determined whether or not the temperature Tw of an engine cooling water is lower than a predetermined level $T_0$. If the temperature $T_w$ of the engine cooling water is equal to or higher than the predetermined level $T_0$, it is determined that warming up of the engine has been completed. Next, in step 802, it is determined whether or not an air conditioner (A/C) is off. Since the warming up of the engine is conducted by opening the throttle valve and by introducing air into the engine through the throttle valve, when the warming up ends, the throttle valve is closed. If the throttle valve is open, it is determined that the vehicle is in a starting state. However, since the comparison opening of the throttle value varies, the determination level is learned in the processes from step 803 to step 805. In a case where the air conditioner is on, the comparison opening of the throttle valve is learned in the same manner.

In step 803, it is determined whether or not 1 is set as flag FLGSS. The flag FLGSS indicates whether or not the determination level $\theta$ss has been learned. If flag FLGSS is not 1, the opening $\theta$ of the throttle valve at that time is set as the comparison level $\theta$ss in step 804. Next, in step 805, 1 is set as flag FLGSS, and then the process goes to step 806 where 0 is set as flag FLGACC which indicates that the vehicle is not in a starting state.

When it is determined that the warming up is not yet completed, i.e., that $T_w < T_0$, or when the A/C is on, if 1 is set as the FLGSS, the process goes from step 803 to step 809 where the opening $\theta$ of the throttle valve is compared with the level $\theta$ss. If the accelerator pedal has not been pressed, $\theta \leq \theta$ss, which means that the vehicle is not in a starting state, and the process goes to step 806 where 1 is maintained as the flag FLGACC, and the process is then ended. If the accelerator pedal has been pressed, $\theta > \theta$ss, which means that the vehicle is in a starting state, and the process goes to step 810 where 1 is set as the flag FLGACC, and the process is then ended.

When it is determined in step 801 that the warming up has been completed and if it is determined in step 802 that the A/C is off, the process goes to step 807. If the warming up has been completed and the A/C is off, the vehicle is under normal idling speed control, and the opening $\theta$ of the throttle valve is substantially constant. So, a predetermined value of $\theta 0$ is employed as the comparison level. If the accelerator pedal has not been pressed, $\theta < \theta 0$, which means that the vehicle is not in a starting state, and the process goes to step 806 where 0 is maintained as the flag FLGACC, and the process is then ended. If the accelerator pedal has been pressed, $\theta > \theta 0$, which means that the vehicle is in a starting state, and the process goes to step 808 where 1 is set as the flag FLGACC, and the process is then ended.

Figure 9:
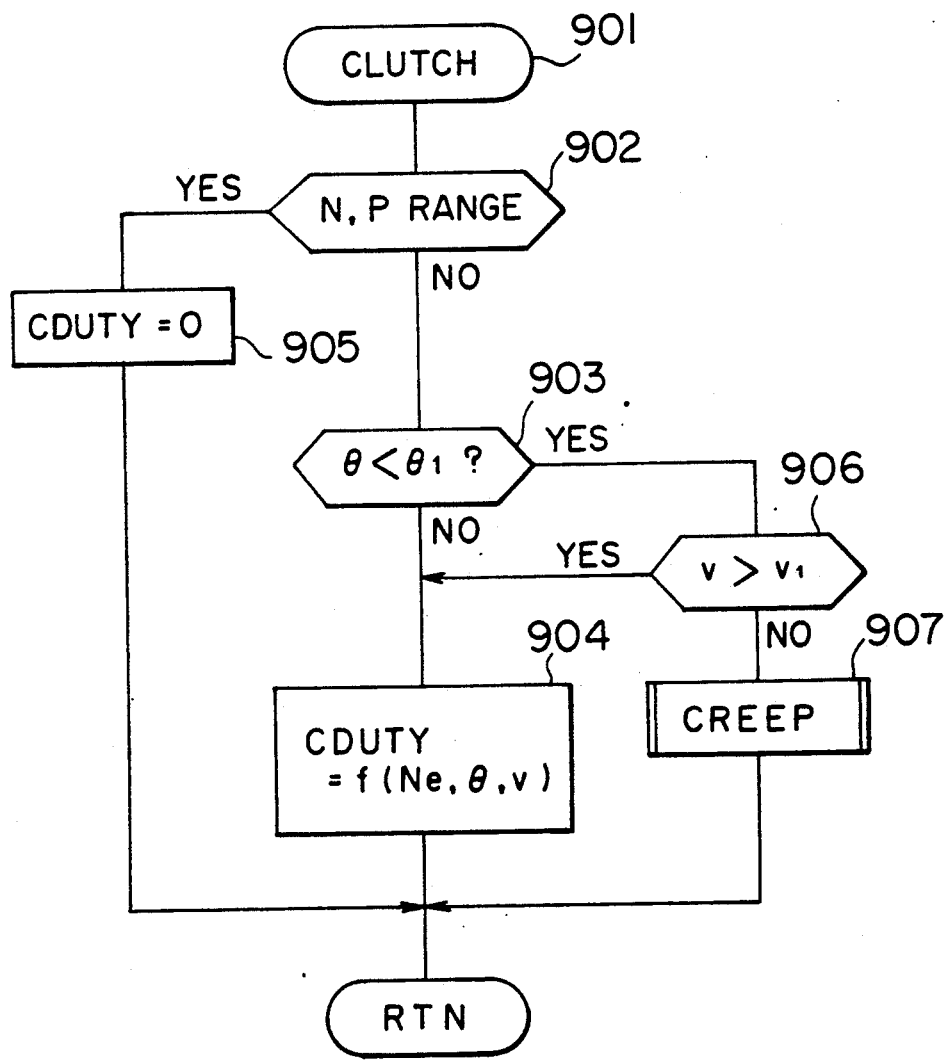
FIGS. 9 and 10 are flowcharts of the operation of the MPU, showing another embodiment of the present invention.
Figure 10:
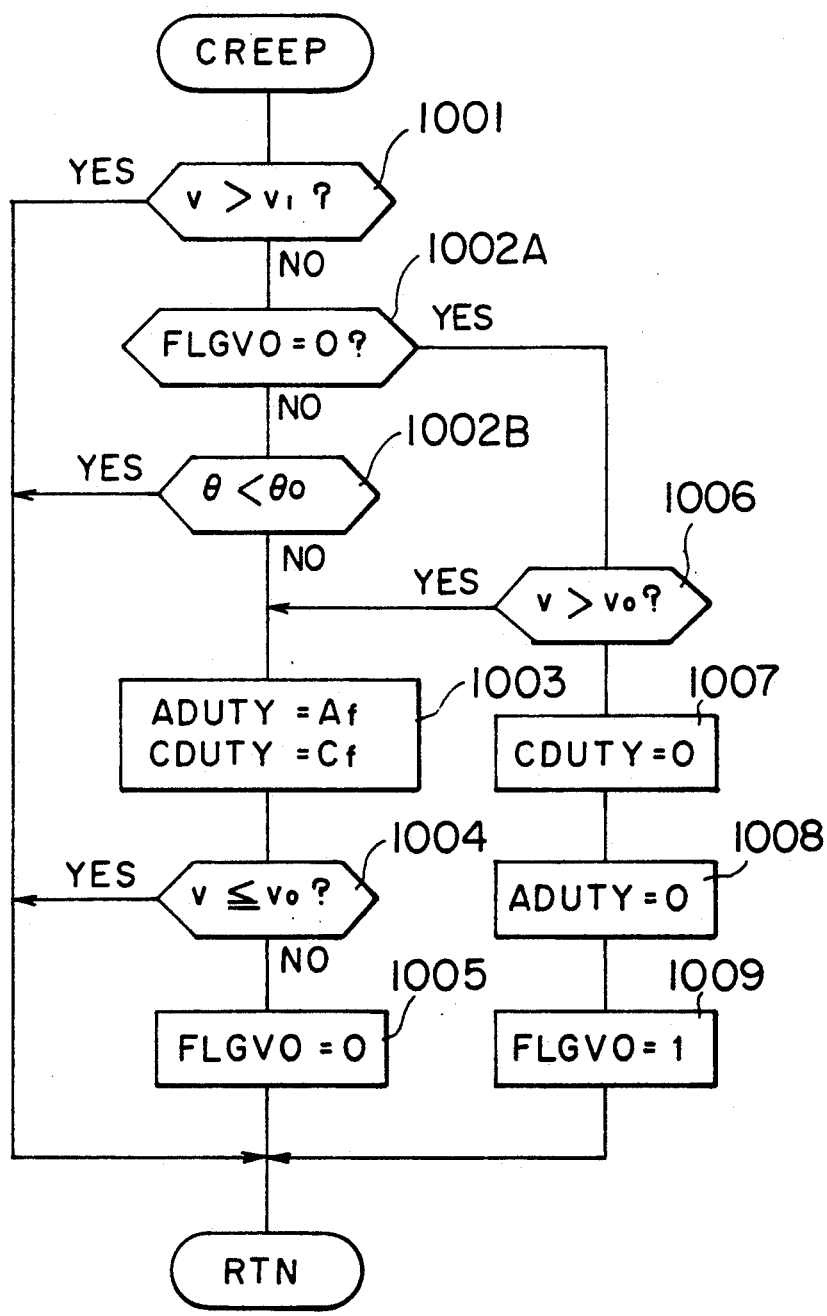

A second embodiment of the present invention will now be described with reference to the flowcharts of FIGS. 9 and 10. The control graphically presented by the flowcharts shown in FIGS. 9 and 10 is carried out by the MPU which executes a corresponding operation each time an interrupt signal is output to the MPU. The interrupt signal is output to the MPU at fixed intervals (e.g., in a period of 20 msec).

FIG. 9 is a flowchart of the control of the electromagnetic clutch 2. First, in step 902, the shift range is checked, i.e., it is determined whether or not the shift lever is in N or P range. If the shift lever is in N or P range, the vehicle is not in a starting state, so 0 is set as the conduction ratio CDUTY of the electromagnetic clutch in step 905, and then the process is ended.

If the shift lever is not in N or P range, the degree at which the accelerator pedal is pressed is determined in step 903. The degree at which the accelerator pedal is pressed is measured by measuring the opening $\theta$ of the throttle valve. If it is determined that $\theta$ is smaller than a predetermined value $\theta 1$, the process goes to step 906. The predetermined value $\theta 1$ represents a value ranging from one tenth to one twentieth of the full opening. In step 906 it is determined whether or not the vehicle speed v is higher than a predetermined value $v_1$. If $v > v_1$, it is determined that the vehicle is in a normal running state, and the process goes to step 904 where the CDUTY used for clutch control is obtained and output as the function of the engine speed Ne and the throttle valve opening $\theta$ or the vehicle speed v. While the vehicle is being accelerated or running at a fixed speed, the conduction ratio CDUTY of the electromagnetic clutch is obtained as the function of the engine speed Ne and the opening $\theta$ of the throttle valve. In this way, the clutch transmission torque corresponding to the engine output torque is generated. The operation of the CDUTY of the electromagnetic clutch is effectively conducted by the MPU 11 using three-dimensional map of CDUTY, Ne and $\theta$. While the vehicle is being decelerated, the conduction ratio CDUTY of the electromagnetic clutch is obtained on the basis of the vehicle speed v, so a to ensure that the engine brake is operated at a degree which matches the running resistance which is represented by the vehicle speed v. If it is determined in step 906 that $v \leq v_1$, the process goes to step 907. The predetermined value $v_1$ represents a value ranging from 5 km/h to 15 km/h. In step 907, the subroutine of the CREEP driving control shown in FIG. 10 is called.

Next, the subroutine CREEP will be described with reference t the flowchart of FIG. 10.

First, it is determined in step 1001 whether or not the vehicle speed v is greater than a predetermined value $v_1$. If the vehicle speed v is greater than the predetermined value $v_1$, the vehicle is running in a normal state, and control of the creeping is unnecessary. So, the process is ended. If it is determined in step 1001 that the vehicle speed v is equal to or less than the predetermined value $v_1$, it is determined in step 1002A whether or not 0 is set as the flag FLGV0 which indicates whether or not the vehicle is at a stop. The flag FLGV0 0 means that the vehicle is being stopped.

If 0 is set as the flag FLGV0, it is determined in step 1006 whether or not the vehicle speed v is greater than a predetermined value $v_0$. The predetermined value $v_0$ represents a value which is slightly smaller than $v_1$, and is used to provide hysteresis in a branch of flow. If the vehicle speed v is greater than the predetermined value $v_0$, the process goes to step 1003. If the vehicle speed v is less than the predetermined value $v_0$, the vehicle is stopped: in step 1007, 0 is set as the conduction ratio CDUTY of the electromagnetic clutch 2, i.e., the clutch is disengaged. Thereafter, in step 1008, 0 is set as a corrected duty value ADUTY of the idling control value, by which the engine speed is maintained to a normal objective idling speed.

The idling valve is provided in a bypassing passage which bypasses the throttle valve for controlling the amount of sucked air. Thereafter, in step 1009, 1 is set as the flag FLGV0 which indicates whether or not the vehicle is at a stop, and the process is then ended.

If it is determined in step 1002A that 0 is not set as the flag FLGV0, the process goes to step 1002B in which it is determined whether or not the opening $\theta$ of the throttle valve is larger than a predetermined level $\theta 0$. The predetermined level $\theta 0$ represents a value which is one third of the full opening. If the opening $\theta$ of the throttle valve is less than the predetermined value $\theta 0$, i.e., if the accelerator pedal has not been pressed, the process is ended. If the accelerator pedal has been pressed, the process goes to step 1003 and the control of creeping is conducted.

In step 1003, Af is set as the idling valve corrected duty value, and Cf is set as the conduction ratio CDUTY of the electromagnetic clutch. Once Af is set as the idling valve corrected duty value, the engine speed increases. Af may be directly increased to a fixed value, or be increased to a fixed value stepwise. Alternatively, Af may be set on the basis of the vehicle speed and the gear ratio. These idling valve corrected duty valve setting methods will be described in detail later. The conduction ratio CDUTY of the electromagnetic clutch is generally set on the basis of the engine output torque. More specifically, it is obtained using the three-dimensional map (CDUTY, Ne, and $\theta$). Next, in step 1004, it is determined whether or not $v \leq v_0$. Since it takes some time for the vehicle to actually start running after the CDUTY has been set in step 1003 and the transmission torque has thereby been generated, while $v \leq v_0$, the process is ended. Once $v > v_0$, 0 is set as the flag FLGV0 which indicates whether or not the vehicle is at a stop, and the process is ended, which means that the vehicle is creeping at a very slow speed.

Once the vehicle is under the creeping control, the process goes from step 1002A to step 1006, and then to step 1003. In other words, the process of step 1002B is skipped and no determination of the opening of the throttle valve is made. More specifically, the creeping control is performed in step 1003 regardless of the state of the opening of the throttle valve.

Once the brake pedal has been pressed and the vehicle speed v has been reduced to less than the predetermined value $v_0$, the process goes from step 1006 to step 1007, and the vehicle stopping control is performed.

Once the accelerator pedal has been pressed to accelerate the vehicle, which has been under the creeping control, the process of step 1001 is executed, and the process is then ended.

In a case where ADUTY is set to a fixed value, Af may be an arbitrary value which assures an engine output that enables the vehicle to creep. In a case where ADUTY is gradually increased to Af which is the arbitrary fixed value so as to ensure that the vehicle starts smoothly, it is increased by fixed values each other this subroutine CREEP is called.

The period at which the MPU executes this process may be set to about 20 msec. Generally, it takes about 1 second for the vehicle to actually star running. In consequence, the idling valve corrected duty value ADUTY may be increased to the fixed value Af when the process has been activated 50 times.

Also, Af may be determined by using the three-dimensional map on the basis of the objective vehicle speed and the gear ratio. In that case, the engine torque output and the gear ratio may be controlled from the deviation between the objective vehicle speed and the actual speed.

What is claimed is:

1. A control unit for controlling the operation of an electromagnetic clutch for an internal combustion engine of a vehicle in which the speed of the vehicle is controlled by an operator through actuation of an accelerator pedal and torque produced by the internal combustion engine is transferred to the vehicle through said electromagnetic clutch, comprising:
    means for determining the speed of the vehicle;
    detecting means for detecting actuation of said accelerator pedal; and
    processor means responsive to said vehicle speed determining means and said detecting means for controlling said electromagnetic clutch by:
    (a) engaging said electromagnetic clutch for creeping movement of the vehicle when said vehicle speed is less than a first predetermined speed and the accelerator pedal has been actuated;
    (b) maintaining a previous engagement of said electromagnetic clutch for maintaining creeping movement of the vehicle when actuation of said accelerator pedal is released so long as the vehicle speed is less than said first predetermined speed and greater than a second predetermined speed, said first predetermined speed being more than said second predetermined speed; and
    (c) disengaging said electromagnetic clutch when said vehicle speed drops below said second predetermined speed and said accelerator pedal has been released.

2. A control unit according to claim 1, idling speed control means for controlling said internal combustion engine to operate at an idling speed, said processor means controlling said idling speed control means to increase said idling speed to a fast idling speed while said electromagnetic clutch is engaged for creeping movement.

3. A transmission for a vehicle according to claim 1, wherein pressing of said accelerator pedal is detected by said detecting means by determining that the opening of a throttle valve is larger than a predetermined value.

4. A transmission for a vehicle according to claim 3, said predetermined value of the opening of said throttle valve is varied by said processor means in accordance with the temperature of the engine or an on/off condition of an air conditioner.

5. A transmission for a vehicle according to claim 3, wherein said predetermined value of the opening of said throttle valve is an opening of said throttle valve which occurs when the vehicle, after operating in a running condition, is being stopped.

6. A transmission for a vehicle according to claim 1, wherein said processor means controls said electromagnetic clutch such that it is disengaged when a shift position is either at neutral (N) or parking (P).

7. A control unit for controlling the operation of an electromagnetic clutch for an internal combustion engine of a vehicle in which the speed of the vehicle is controlled by an operator through actuation of an accelerator pedal and torque produced by the internal combustion engine is transferred to the vehicle through said electromagnetic clutch, comprising:
    means for determining the speed of the vehicle;
    detecting means for detecting actuation of said accelerator pedal;
    means for engaging said electromagnetic clutch for creeping movement of the vehicle when said vehicle speed is less than a first predetermined speed and the accelerator pedal has been actuated;
    means for maintaining a previous engagement of said electromagnetic clutch for maintaining creeping movement of the vehicle when actuation of said accelerator pedal is released so long as the vehicle speed is less than said first predetermined speed and greater than a second predetermined speed, said first predetermined speed being more than said second predetermined speed; and means for disengaging said electromagnetic clutch when said vehicle speed drops below said second predetermined speed and said accelerator pedal has been released.

* * * * *